United States Patent [19]
Stahnecker et al.

[11] 3,887,672
[45] June 3, 1975

[54] MANUFACTURE OF SADDLE-SHAPED DISCS FROM EXPANDABLE STYRENE POLYMERS

[75] Inventors: Erhard Stahnecker, Ziegelhausen; Georg Ruppert, Ludwigshafen; Rolf Möeller, Ludwigshafen; Rupert Schick, Ludwigshafen; Ludwig Züern, Bad Duerkheim, all of Germany

[73] Assignee: Badische Anilin- & Soda-Fabrik Aktiengesellschaft, Ludwigshafen (Rhine), Germany

[22] Filed: Nov. 2, 1972

[21] Appl. No.: 303,138

[30] Foreign Application Priority Data
Nov. 4, 1971  Germany.............................. 2154754

[52] U.S. Cl. ...................... 264/51; 264/53; 264/54; 264/210 R
[51] Int. Cl............................................. B29d 27/00
[58] Field of Search............... 264/51, 53, 54, 210 R

[56]         References Cited
            UNITED STATES PATENTS

| | | |
|---|---|---|
| 2,945,261 | 7/1960 | Aykanian et al..................... 264/53 |
| 3,033,806 | 5/1962 | Spencer................................ 264/53 |
| 3,066,382 | 12/1962 | Zweigle et al. ...................... 264/51 |
| 3,188,264 | 6/1965 | Holden ................................. 264/51 |
| 3,296,661 | 1/1967 | Moustier............................. 264/210 |
| 3,400,037 | 9/1968 | Sare et al............................. 264/53 |
| 3,723,237 | 3/1973 | Fuss..................................... 264/210 |

*Primary Examiner*—Eugene C. Rzucidlo
*Attorney, Agent, or Firm*—Johnston, Keil, Thompson & Shurtleff

[57] ABSTRACT

Manufacture of expandable styrene polymers which on expansion provide oval saddle-shaped discs suitable for use as bulk cushioning material. In the process, cylindrical extrudates of expandable styrene polymers are deformed at form 70° to 90°C by means of rollers to form strands of oval cross-section, which strands are then sliced to form discs by cutting in the direction of the short axis of said oval cross-section.

1 Claim, 1 Drawing Figure

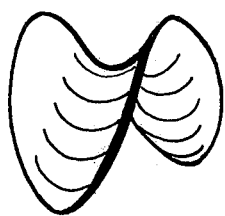

MANUFACTURE OF SADDLE-SHAPED DISCS FROM EXPANDABLE STYRENE POLYMERS

This invention provides a process for the manufacture of expandable styrene polymers which on expansion provide oval saddle-shaped discs suitable for use as bulk cushioning material.

It is known that foamed moldings of plastics may be used for packaging fragile objects. This type of packaging is only economical on mass-produced objects, since molds must be provided which correspond to the contours of the object to be packaged.

It is usual to fill spaces in packaging containers with wood-wool or foamed polymer particles. Drawbacks of wood-wool are its comparatively high bulk density, its relatively large content of dust, its tendency to absorb moisture and become moldy and also the fact that it requires costly manipulation by hand. Bulk packaging aids such as foamed plastics particles are more convenient. Spherical foamed particles are not suitable, however, due to their lack of shake resistance. That is to say, the particles should be such that, when subjected to the pressure of the packaged object, they tend to engage or grip one another instead of being pushed to one side. For example, use has been made, for this purpose, of elongated foamed particles of irregular shape. However, the production of said particles by foaming appropriate particles can only be carried out using specialized foaming equipment. Other proposals aim at producing such particles by breaking up extrudates of complicated surface structure. However, this calls for expensive extrusion dies having nozzles of complicated shape.

It is an object of the present invention to provide a process for the manufacture of bulk cushioning material not showing the above drawbacks.

This object is achieved by a process for the manufacture of expandable styrene polymers which, on expansion, form oval saddle-shaped discs, wherein cylindrical extrudates of expandable styrene polymers are deformed at from 70° to 90°C by rollers to form strands having an oval cross-section, which strands are then sliced in the direction of the short axis of said oval cross-section.

The perpendicular axes of the oval or elliptical discs cut from the still partially plastic strand bend when the discs are foamed or even prior to foaming due to internal stresses, which bending takes place in opposite directions to a degree depending on the thickness of the discs, to form saddle-shaped bodies (see accompanying drawing). These foamed particles have been found to be excellent bulk packaging materials showing a good cushioning effect and effective inter-engagement giving a stationary conglomeration of packaging particles.

By styrene polymers we mean polystyrene and copolymers of styrene containing at least 50% and preferably at least 75% by weight of polymerized units of styrene. Suitable comonomers are ethylenically unsaturated copolymerizable compounds such as α-methylstyrene, nuclear-halogenated styrenes, nuclear-alkylated styrenes containing from 1 to 4 carbon atoms in the alkyl moiety, acrylonitrile, methacrylonitrile, acrylates, methacrylates and fumarates of alcohols of from 1 to 10 carbon atoms, butadiene and N-vinyl compounds such as N-vinylcarbazole, N-vinylpyridine or, in small quantities (less than 0.5% by weight), divinyl compounds such as butanediol diacrylate and divinylbenzene.

The expandable styrene polymers contain expanding agents. Suitable expanding agents are those conventionally used, i.e. aliphatic or cycloaliphatic hydrocarbons or halohydrocarbons having a boiling point of not more than about 90°C and which are non-solvents for the styrene polymers but which may be homogeneously mixed therewith in quantities of from about 2.5 to 9% by weight, for example n-, iso- and neo-pentanes, hexane, cyclohexane, n- and iso-butanes, propane, difluorodichloromethane and mixtures thereof.

The expanding agents may be added to the styrene polymers in any desired manner and at any stage, for example during polymerization of the monomers or in the extruder forming the cylindrical extrudate.

The styrene polymers may contain other additives such as dyes, fillers, stabilizers and flame retardants, the last-named being of a plurality of components if desired, e.g. of halogen compounds, in particular bromine compounds, in combination with synergistic additives.

The cylindrical extrudates are produced by usual methods, for example by extruding the molten expandable styrene polymer through circular nozzles having a diameter of from 3 to 10 mm and preferably from 5 to 8 mm at a melt temperature of from about 90° to 150°C and in particular from 110° to 120°C, with the extrudate passing into a coolant, usually water, at approximately room temperature. The extrudates are surface cooled so rapidly that no foaming takes place. The residence time in the cooling bath and the temperature of the latter are adjusted so that the extrudates, when leaving the bath, are sufficiently warm to be internally plastic. They then pass, preferably in the said partially plastic state, between two rollers so as to receive an oval or elliptical cross-section, in which the ratio of the axes is 1:1.2 to 1:3 and preferably from 1:1.3 to 1:2. Combinations of one elastic and one nonelastic roller, for example one roller of rubber and one of steel, have proved highly satisfactory for this purpose. The peripheral speeds of the rollers may be adjusted so that the extrudates are stretched or not as desired. Alternatively, stretching may be previously effected by a pair of rollers of the kind used for feeding extrudates to granulating equipment. Deformation of the cylindrical extrudate may also be carried out by means of a number of twin rollers in succession. These rollers are usually smooth, but they may be profiled if desired.

The extrudates are then sliced into discs by sharp rotating blades which cut in the direction of the short axis of the oval cross-section of the extrudate this conveniently being effected immediately downstream of the rollers, i.e. at virtually the same temperature. The ratio of the thickness of the resulting discs, as measured in the direction of the axis of the extrudate, to the said short axis is from 1:5 to 1:10 and preferably from 1:3 to 1:6. Cutting is preferably effected in a plane perpendicular to the axis of the extrudate, but it may be carried out in an oblique plane if desired.

Roller-deformation and cutting are carried out at temperatures of from 70° to 90°C. In continuous operations, as described above as the preferred method, the working temperature may be measured most simply by measuring the temperature of the resulting particles. A thermometer inserted into the resulting discs immediately after their manufacture shows a temperature of from 65° to 87°C and preferably from 75° to 85°C. The temperature range of from 70° to 90°C given for the extrudates on passing between the rollers and entering the granulating equipment is estimated from the temperature of the fresh discs, since it is technically very involved to measure the temperature of the extrudates direct, which temperature is by no means uniform throughout the extrudate but rises toward its center. Thus the temperature range given, i.e. 70°–90°C, is the estimated average temperature of the extrudates.

Foaming is carried out in conventional manner using commercial foaming apparatus, for example by means of steam at from 100° to 150°C. The particles are usually foamed to a bulk density of from 4 to 15 g/l.

Before foaming, the oval discs usually have short and long axes measuring from 2 to 10 mm and from 3 to 20 mm respectively and thicknesses of from 0.8 to 3 mm. On foaming, these measurements increase from three to four times.

The process of the invention is simple to carry out. Manufacture and processing of the material call for no special apparatus but require only commonly employed equipment, i.e. normal extruders having round dies and conventional granulating equipment, of which only the twin rollers need to be modified, and conventional prefoaming apparatus. The necessary rollers are also commercially available. It is surprising that this simple process provides a shake-proof bulk cushioning material. The decisive factor in the success of the process, namely the bending of the discs of form saddle-shaped bodies which engage in each other when subjected to pressure, was not foreseeable.

EXAMPLE 1

Polystyrene having a K value of 59 (measured according to H. Fikentscher, Cellulosechemie, 13, 1932, p. 58) and produced by suspension polymerization in the presence of pentane has an average particle size of 0.5 mm in diameter and contains 5.5% w/w of pentane as expanding agent. To this polystyrene there is added 0.1% of butyl stearate and the mixture is plasticized in a heated single-worm extruder having a diameter of 90 mm and a length of 1,350 mm and equipped with a normal-type worm and is extruded at a melt temperature of 137°C through a die having orifices of 4.5 mm in diameter into a water bath having a temperature of 20°C. After a residence time in the bath of 12 seconds, the extrudate is passed to granulating equipment containing a pair of shaping rollers, of which one is of steel and the other of rubber having a Shore hardness of 80°C. Rotary knives slice the extrudate in the direction of the short axis of the cross-section of the deformed extrudate to form thin discs. The thus obtained slices are in the form of oval saddle-shaped discs measuring 5×3.5×1 mm, the smallest measurement being in the machine direction of the extrudate. The temperature of the discs immediately after their manufacture is 74°C.

The discs may be foamed to a bulk density of 9 g/l by applying steam, during which process the discs substantially retain their saddle shape.

The foamed material is eminently suitable for use as a loose shake-proof filling material in packages.

EXAMPLE 2

In a heated twin-worm extruder containing molten polystyrene produced by solution polymerization and having a K value of 63 (H. Fikentscher, Cellulosechemie, 13, 1932, p. 58), 6.5% w/w of a mixture of 80% of n-pentane and 20% of isopentane is added. The homogenized mixture is extruded through a perforated die having orifices of 7 mm in diameter, the extrudates being immediately drawn through a water bath having a temperature of 18°C, the residence time being 15 seconds. They are then drawn between the pair of rollers described in Example 1 so as to be deformed to an elongated cross-section. Non-planar discs cut from the extrudates by means of a conventional granulator have the approximate measurements 5×8.5×1.5 mm, the longest measurement being perpendicular to the machine direction. A thermometer inserted into a heap of the freshly made discs shows a reading of 75°C.

When treated with steam, the discs form uniform, saddle-shaped bulk material having a bulk density of about 8 g/l. This material shows, on account of its complicated particle shape, very good shake-proof properties when used as loose cushioning material in packages.

We claim:

1. A process for the manufacture of saddle-shaped discs from styrene polymers which process comprises: passing molten styrene polymers containing at least 50% by weight of polymerized styrene units through an extruder at melt temperatures of from 90° to 150°C to form cyclindrical extrudates containing an expanding agent; passing said extrudates through a coolant at such a rate that no expansion takes place, the residence time in the cooling bath being such that the extrudate remains internally plastic; shaping said extrudates by passing the extrudates at temperatures of from 70° to 90°C between rollers to form strands having an oval cross-section; slicing said shaped strands in the direction of the short axis of said oval cross-section to form discs of which the ratio of thickness to short axis is from 1:5 to 1:10, the thickness being measured in the machine direction of the extrudate; and thereafter foaming said discs to form particles having a bulk density of from 4 to 15 g/l.

* * * * *